United States Patent Office 3,170,934
Patented Feb. 23, 1965

3,170,934
UNSATURATED 19-OXYGENATED 3-OXO-STEROIDS AND PROCESS FOR THEIR MANUFACTURE
Albert Wettstein, Riehen, Georg Anner, Karl Heusler, and Jaroslav Kalvoda, Basel, and Heilmut Ueberwasser, Riehen, Switzerland, assignors to Ciba Corporation, New York, N.Y., a corporation of Delaware
No Drawing. Filed Sept. 7, 1962, Ser. No. 222,226
Claims priority, application Switzerland, July 15, 1960, 8,133/60; Oct. 28, 1960, 12,107/60; Dec. 23, 1960, 14,393/60; Apr. 5, 1961, 3,991/61; June 2, 1961, 6,482/61; Sept. 18, 1961, 10,803/61; Sept. 22, 1961, 11,071/61; Jan. 9, 1962, 185/62
5 Claims. (Cl. 260—397.1)

The present invention concerns 19-oxygenated $\Delta^4$- and $\Delta^5$-3-oxo-steroids and a new process for their preparation starting from $\Delta^4$-3-oxo-6β:19-oxido-steroids. The term "19-oxygenated steroids" designates 19-nor-steroids which contain in the 10-position a hydroxymethyl, acyloxymethyl, formyl, acetalized formyl, carboxy and esterified carboxy group.

This application is a continuation-in-part of our copending application Ser. No. 122,656, filed July 10, 1961, by Albert Wettstein et al., now United States Patent No. 3,077,482.

The process of this invention is an important step in a novel and simple conversion of normal steroids into 19-nor-steroids. Since a number of 19-nor-steroids, more especially derivatives of 19-nor-testosterone and of 19-nor progesterone, are used extensively as anabolic, androgenic, gestagenic and progestational agents a new process for the production of these compounds is of great importance. So far the 19-nor-steroids were available only by a complicated sequence of reactions which involve pyrolytic aromatization of the ring A and subsequent reduction with an alkali metal and ammonia. An alternative synthesis uses a microbiological hydroxylation of the 19-carbon atom followed by elimination of the angular C-19-substituent. The yield in the hydroxylation step however is in most cases unsatisfactory. In both known processes the possibilities for variations in substituents in rings B, C and D are very restricted due to the drastic conditions in the pyrolysis step on one hand and to the substrate-specificity of the enzymatic reaction on the other hand.

The new process however gives not only high yield of the desired end products but can be applied to a wide variety of different steroids since oxo groups, ketalized oxo groups, esterified and etherified hydroxy groups, halogen substituents or double bonds do not interfere in the reaction claimed.

The new process for the production of 19-nor-compounds however gives not only high yields of the desired end products, but can also be applied to a wide variety of different steroids since oxo groups, ketalized oxo groups, esterified and etherified hydroxyl groups, halogen atoms or double bonds do not interfere with the reactions used in the new process. This new process consists in (a) Treating a 19-unsubstituted 5α-halogen-6β-hydroxy-steroid with a system generating monovalent positive iodine (e.g. with a lead tetraacylate and iodine) under such conditions as will bring about a homolytic cleavage of any 6-hypoiodite formed (e.g. by boiling in cyclohexane solution under irradiation with visible light) or with a lead tetraacylate in an apolar solvent (e.g. methyl cyclohexane or benzene), (b) introducing a $\Delta^4$-3-oxo grouping into the 6β:19-oxido-steroids formed in step (a), if desired after introduction of an oxo group in 19-position by formation of a 3-oxo group for example by oxidation of a 3-hydroxy group and elimination of the 5α-halogen atom as hydrohalic acid, (c) Reducing the $\Delta^4$-3-oxo-6β:19-oxido-steroid to form a 19-oxygenated-$\Delta^4$-3-oxo-steroid and, (d) Eliminating the oxygenated C-19-methyl group by base or acid treatment in known manner.

The present invention is concerned primarily with part (c) of the above process. It consists in treating a $\Delta^4$-3-oxo-6β:19-oxido-steroid with a metallic reducing agent.

The $\Delta^4$-3-oxo-6β:19-oxido-steroids used as starting materials in the process of the invention may contain in 19-position also a free or functionally converted hydroxyl or an oxo group, i.e. it is also possible to use the cyclic 19:6β-hemiacetals of $\Delta^4$-3:19-dioxo-6β-hydroxy-steroids or the 19:6β-lactones of $\Delta^4$-3-oxo-6β-hydroxy-steroid-19-oic acids.

The starting materials belong to the spirostane, androstane, pregnane, cholane, chloestane, stigmastane and cardanolide series and may contain in the ring system, more especially in one or several of the positions 1, 2, 7, 8, 9, 11, 12, 14, 15, 16, 17, 20 and 21, further substituents, such as free or functionally converted oxo groups, esterified or etherified hydroxyl groups, alkyl (for example methyl) groups and/or halogen atoms. Functionally converted oxo groups are ketalized oxo groups or oxo groups converted into enol derivatives, for example enol ethers or enol esters. Furthermore, the starting materials may also contain double bonds or oxido groups, for example in positions 9:11 or 16:17.

The acyloxy radicals mentioned above, representing esterified hydroxyl groups are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenanthic, decanoic, trifluoroacetic, carbonic-monomethyl or -ethylester, hexahydrobenzoic, cyclopentyl-propionic, phenylpropionic, benzoic or furoic acid. The halogen atoms mentioned are fluorine, chlorine or bromine and the lower alkyl, alkenyl or alkinyl radicals are such as contain at most 7 carbon atoms for example methyl, ethyl, n- or i-propyl, -butyl, -pentyl, -hexyl or -heptyl, vinyl, allyl, methallyl, ethinyl, 2-methyl-ethinyl; 2-chloro-ethinyl and 2-trifluoromethyl-ethinyl. Ketalized oxo groups are for example lower alkylene dioxy groups, such as ethylene-dioxy or propylenedioxy groups and etherified hydroxy groups are for example lower alkoxy groups such as methoxy, ethoxy or propoxy groups or the tetrahydropyranyloxy group.

The starting materials are prepared from 19-unsubstituted 5α-halogen-6β-hydroxy-steroids by the process mentioned above under parts (a) and (b) and are described in detail in our copending application Ser. No. 222,168, filed September 7, 1962.

Particularly valuable starting materials are $\Delta^4$-3-oxo-6β:19-oxido compounds of the androstane, pregnane and spirostane series, for example:

$\Delta^4$-3:17-dioxo-6β:19-oxido-androstene,
$\Delta^4$-3-oxo-6β:19-oxido-17β-hydroxy-androstene and its esters,
$\Delta^4$-3-oxo-6β:19-oxido-17β-hydroxy-17α-alkyl-, -17α-alkenyl- and -17α-alkinyl-androstenes, more especially the -17α-methyl-, -17α-ethyl, -17α-isobutyl, -17α-butyl, -17α-allyl, -17α-vinyl-, -17α-ethinyl-, -17α-(2-methyl)-ethinyl-compounds and their esters.

Further mention deserve:

$\Delta^4$-3:20-dioxo-6β:19-oxido-pregnene,
$\Delta^4$-3:20-dioxo-6β:19-oxido-21-hydroxy-pregnene and its esters,
$\Delta^4$-3:20-dioxo-6β:19-oxido-17α:21-dihydroxy-pregnene and its esters, Δ⁴-3:20-dioxo-6β:19-oxido-17α-hydroxy-pregnene,
Δ⁴-3:20-dioxo-6β:19-oxido-17α-acetoxy-pregnene,
Δ⁴-3:20-dioxo-6β:19-oxido-17α-capronyloxy-pregnene,
Δ⁴-3:20-dioxo-6β:19; 16:17α-bisoxido-pregnene,
Δ⁴-3:11:20-trioxo-6β:19-oxido-pregnene,
Δ⁴-3:20-dioxo-11α-acetoxy-pregnene,
the 18:20-lactone of Δ⁴-3-oxo-6β:19-oxido-20β-hydroxy-pregnene-18-acid,
Δ⁴-3-oxo-6β:19-oxido-spirostene, and similar compounds.

Particularly suitable for the reduction according to the present invention are metallic reducing agents, more especially such as are capable of converting the Δ⁴-3-oxo-grouping during the splitting reaction into a Δ³·⁵-enolate. Especially suitable are metals of the first main group and of the second main and subgroup of the Periodic Table, if desired in combination with compounds giving off hydrogen, for example alkali metals such as sodium, potassium or lithium, or alkaline earth metals such as calcium, more especially in the form of a solution in liquid ammonia or in a liquid amino alkane such as ethylamine, isopropylamine, ethylenediamine or the like, if desired with addition of a diluent, such as ether, tetrahydrofuran or dioxane. For technical purposes the reduction with zinc is of special importance, whereby zinc enolates are formed accompanied by the opening of the oxide ring. As solvents there are used alcohols or with advantage a lower aliphatic carboxylic acid such as acetic or propionic or similar acids, if desired with addition of a diluent such as benzene, dioxane or the like. After hydrolysis of the enolates (which are only stable in non-hydroxylic solvents), there are obtained, depending on the reaction temperature, Δ⁵-3-oxo-19-hydroxy-steroids or directly Δ⁴-3-oxo-19-hydroxy-steroids. The Δ⁵-3-oxo compounds can be isomerized in known manner with acidic or alkaline agents to form the Δ⁴-3-oxo compounds. Alternatively, the reduction may be performed by simple heating with active zinc in a suitable solvent, for example toluene, xylene or the like. When the reduction is carried out with zinc in a carboxylic acid anhydride, for example in acetic anhydride, Δ⁴-3-oxo-19-acetoxy-steroids are formed.

The Δ⁴-3-oxo-19-hydroxy-steroids formed by splitting with zinc and acid may be esterified, if desired, in position 19. For this purpose there are preferably used reactive derivatives of the acids listed above.

According to another method of opening the 6β:19-oxide ring the Δ⁴-3-oxo-6β:19-oxides are treated with chromium⁺² salts such as chromous chloride or chromous acetate in a water-miscible solvent, such as aqueous dioxane, or in glacial acetic acid.

If desired, further substituents may be introduced in the 19-hydroxy-Δ⁴-3-ketones; thus, for example, acetylenes or alkyl-metal compounds may be added on to Δ⁴-3:17-dioxo-19-hydroxy-androstene, advantageously after having esterified or etherified the 19-hydroxy group and, optionally, after having protected the Δ⁴-3-keto grouping by ketalization or enol ether formation, after which the protective groups are again removed from the resulting 17β-hydroxy-17α-alkinyl-androstenes or -17α-alkyl-androstenes.

For conversion of the Δ⁴-3-oxo-19-hydroxy-steroids obtained by the present process into 19-nor-steroids they are treated, for example, in known manner with strong alkalies such as hydroxides or alcoholates of alkali metals. It is, however, of advantage to oxidize the 19-hydroxyl group to the 19-oxo or 19-acid group before elimination of the angular 19-carbon atom, for example with chromic acid/pyridine complex or with chromium trioxide in glacial acetic acid or in acetone+sulfuric acid. From the Δ⁴-3:19-dioxo compounds formic acid is split off even by means of a mild treatment with an alkali, and the decarboxylation of Δ⁴-3-oxo-19-acid is even easier to perform. As is known, decarboxylation by heating in pyridine produces predominantly Δ⁵⁽¹⁰⁾-3-oxo-19-nor-compounds which are then converted into Δ⁴-3-oxo-19-nor-steroids in known manner, for example by treatment with an acid.

Another way of eliminating the 19-carbon atom is heating the Δ⁴-3-oxo-19-hydroxy-steroid compound with a ketone and an aluminum alcoholate or magnesium alcoholate, for example with cyclohexanone, a quinone, benzophenonone and aluminum isopropylate, tertiary butylate or phenolate in a suitable solvent such as benzene or toluene.

The present invention is also concerned with new 19-oxygenated testosterone esters of the formula

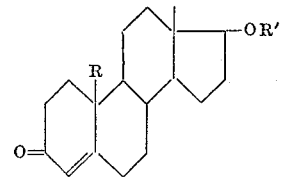

wherein R stands for a hydroxymethyl, an aldehyde or a carboxyl group and R' stands for an acyl radical with more than 3 carbon atoms. Especially important are those derivatives in which the R' radical represents a β-phenyl-propionyloxy, β-cyclopentyl-propionyloxy or a decanoyloxy radical. From the 19-hydroxy-compounds (R=CH₂OH in the above formula) these are obtained by oxidation with chromium trioxide in pyridine the corresponding aldehydes (R=CHO) or with chromium trioxide in acetone-sulfuric acid the corresponding 19-oic acids (R=COOH). In the aldehyde or the acids the angular substituent can be eliminated in known manner, from the aldehydes for example by heating with aluminum isopropoxide or by chromatography an alumina or silica gel, from the acids by treatment with a mineral acid, e.g. hydrochloric acid in tertiary butanol. Since during these elimination reactions the ester group in 17β-position is retained there are obtained the corresponding esters of 19-nor-testosterone, namely 19-nor-testosterone-β-phenylpropionate, 19-nor-testosterone-β-cyclopentylpropionate and 19-nor-testosterone-decanoate which are well known anabolic and androgenic agents.

An additional object of the invention are the derivatives of 17α-ethinyl-19-nor-testosterone which are substituted in 10-position an aldehyde or carboxylic acid radical. By the reactions described above these compounds are easily converted into 17α-ethinyl-19-nor-testosterone, a well-known ovulation inhibitor. By heating the 17α-ethinyl-testosterone-19-oic acid in pyridine solution Δ⁵⁽¹⁰⁾-3-oxo-17α-ethinyl-17β-hydroxy-19-nor-androstene is obtained, a compound of particular interest as an antifertility agent.

A further object of the invention are also progesterone derivatives of the following formula

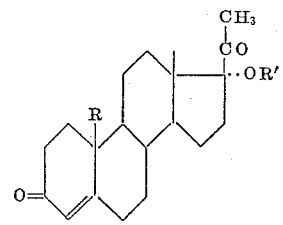

wherein R stands for a hydroxymethyl, an aldehyde or carboxyl group and R' stands for an alkanoyloxy group with at most 15 carbon atoms. Especially important are the 17α-acetoxy- and 17α-caproyloxy-derivatives. By the reaction described above they are transformed into 17α-acetoxy-19-nor-progesterone and 17α-caproyloxy-19-nor-progesterone, both highly active oral progestational agents.

Still a further object of the invention are 11:19-dioxygenated pregnenes of the formula

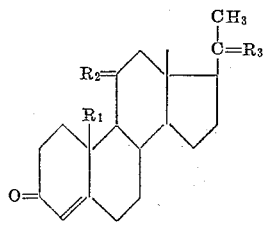

wherein $R_1$ stands for a hydroxymethyl or an aldehyde group, $R_2$ and $R_3$ stands for an oxo, a hydroxy or acyloxy group and these compounds can easily be transformed into 11-oxo-19-nor-progesterone which shows progestational activity.

The following examples illustrate the invention. The temperatures are given in centigrades.

Example 1

A solution of 1.0 gram of $\Delta^4$-3:17-dioxo-6$\beta$:19-oxido-androstene in 20 cc. of glacial acetic acid is mixed with 25 grams of zinc dust (activated by washing with dilute acetic acid, water and glacial acetic acid) and the whole is stirred for 20 minutes at 25–30° C. The unconsumed zinc is then suctioned off, the filter residue is rinsed with glacial acetic acid, the filtrate is concentrated in a water-jet vacuum at 25 to 30° C. The residue is taken up in chloroform, and the solution is washed with water and sodium bicarbonate solution, dried and evaporated in a water-jet vacuum. By washing the crystalline residue with a mixture of ether and petroleum ether, there are obtained 640 mg. of $\Delta^5$-3:17-dioxo-19-hydroxy-androstene melting at 168 to 170° C.

When a chloroform solution of this compound is treated for 5 minutes with hydrogen chloride gas and then washed until it is neutral, there is obtained an almost quantitative yield of $\Delta^4$-3:17-dioxo-19-hydroxy-androstene which melts at 170–171° C. after recrystallization from acetone+hexane; the melt then solidifies again and has a melting point of 181° C.

When the reaction described above is carried out with zinc for 10 minutes at 90–100° C., the primarily formed $\Delta^5$-3-ketone undergoes rearrangement even under the reaction conditions and gives rise directly to $\Delta^4$-3:17-dioxo-19-hydroxy-androstene melting at 170–171° C.

Example 2

A solution of 1.0 gram of $\Delta^4$-3:17-dioxo-6$\beta$:19-oxido-androstene in 30 cc. of acetic anhydride is treated with 25 grams of activated zinc dust and heated with stirring for 5 minutes at 130° C. The unconsumed zinc is then filtered off and the filtrate is evaporated to dryness in a water-jet vacuum. The residue is taken up in chloroform, washed with sodium bicarbonate solution and with water, and the dried chloroform solution is evaporated to dryness. The residue (0.95 gram) contains amorphous $\Delta^4$-3.17-dioxo-19-acetoxy-androstene whose infra-red spectrum is characterized by the absence of hydroxyl bands, but it contains strong bands at 5.75/5.80$\mu$ (acetate+17-ketone), 5.98$\mu$ ($\Delta^4$-3-ketone) and 8.12$\mu$ (acetate).

Example 3

500 mg. of $\Delta^4$-3:20-dioxo-6$\beta$:19-oxido-pregnene (6$\beta$:19-oxido-progesterone) are reduced as described in Example 1 with zinc in glacial acetic acid at 90–100° C., to yield $\Delta^4$-3:20-dioxo-19-hydroxy-pregnene (19-hydroxy-progesterone) which melts at 173–174° C. after recrystallization from methylene chloride+hexane. Optical rotation $[\alpha]_D = +184°$ (in chloroform).

Analogous reduction with zinc of 620 mg. of $\Delta^4$-3:20-dioxo-6$\beta$:10-oxido-17$\alpha$-acetoxy-pregnene at 90° C. yields 450 mg. of $\Delta^4$-3:20-dioxo-17$\alpha$-acetoxy-19-hydroxy-pregnene, melting at 235–237° C.

Example 4

A solution of 1.30 grams of 19-hydroxy-progesterone in 30 cc. of pyridine is added to a solution of 2.6 grams of chromium trioxide in 25 cc. of water and 50 cc. of pyridine. The mixture is heated while being stirred for one hour at 60° C., cooled, poured over ice, repeatedly extracted with ether, and the extracts are successively washed with water, dilute hydrochloric acid, water, sodium bicarbonate solution and with water, dried, and the ethereal solution is evaporated in a water-jet vacuum, to yield 1.25 grams of crude 10-oxo-progesterone melting at 139.5–140.5° C. The pure compound, obtained by recrystallization from ether+petroleum ether, melts at 140 to 142° C. Optical rotation $[\alpha]_D^{27} = +249.4°$ C. (in chloroform). The infra-red spectrum (in methylene chloride) contains bands, inter alia, at 3.63, 5.86 (with shoulder at 5.80$\mu$), 5.96, 6.16, 7.36, 8.16, 8.28, 8.60 and 11.54$\mu$.

Analogous oxidation of 450 mg. of $\Delta^4$-3:20-dioxo-17$\alpha$-acetoxy-19-hydroxy-pregnene yields 395 mg. of $\Delta^4$-3:19:20-trioxo-17$\alpha$-acetoxy-pregnene, which melts at 258–260° C. Optical rotation $[\alpha]_D = +122°$ (in chloroform).

Example 5

8 cc. of caprylchloride are stirred within 2 minutes at 10 to 15° C. into a solution of 12.2 grams of 6$\beta$:19-oxido-testosterone in 36 cc. of pyridine. The cooling is then removed and the mixture is stirred on for 30 minutes, then treated with ice and ice water, stirred for 2 hours and taken up in benzene. The benzene solution is washed with 2 N-hydrochloric acid and then with ice-cold sodium bicarbonate solution of 5% strength and dried with sodium sulfate. Evaporation under vacuum yields 17.5 grams of $\Delta^4$-3-oxo-6$\beta$:19-oxido-17$\beta$-decanoyloxyandrostene as a pale oil.

A solution of 8.75 grams of this crude product in 8.75 cc. of benzene is stirred into a paste of 250 grams of zinc dust (activated by washing with dilute acetic acid and then with concentrated acetic acid) in glacial acetic acid. The reaction mixture is stirred for 1½ hours at 17 to 24° C., diluted with 400 cc. of benzene, the excess zinc is suctioned off and rinsed with benzene. The benzene solution is washed with water and then with ice-cold sodium bicarbonate solution, dried with sodium sulfate and evaporated under vacuum.

The residue contains a main product $\Delta^5$-3-oxo-17$\beta$-decanoyloxy-19-hydroxy-androstene; it is dissolved in 50 cc. of chloroform, treated with 5 cc. of concentrated hydrochloric acid and shaken for 5 minutes at 0 to 5° C., then separated, and the chloroform layer is washed with sodium bicarbonate solution, dried and evaporated in a water-jet vacuum. Yield: 8.2 grams of crystalline $\Delta^4$-3-oxo-17$\beta$-decanoyloxy-19-hydroxy-androstene which melts at 99 to 100° C. after having been recrystallized from ether.

When in this example caprylchloride is replaced by hydrocinnamylchloride and the oily 6:19-oxido-testosterone-$\beta$-phenyl-propionic acid ester is subjected to reduction with zinc dust for 4 to 5 hours at 18 to 23° C., an equally good yield of $\Delta^4$-3-oxo-17$\beta$-($\beta$-phenyl-propionyloxy)-19-hydroxy-androstene melting at 131° C. is obtained. The $\Delta^4$-3-oxo-17$\beta$-($\beta$-phenyl-propionyloxy)-19-acetoxy-androstene, prepared from the latter product with acetic anhydride in a pyridine solution, melts at 98° C. after crystallization from alcohol.

Example 6

A solution of 2.20 grams of 19-hydroxy-progesterone in 110 cc. of acetone is cooled to 0° C. and 11.0 cc. of a solution, diluted with water to 50.0 cc., of 13.3 grams of chromium trioxide in 11.5 cc., of concentrated sulfuric acid are stirred in. The whole is stirred for another 40 minutes at 0–5° C., a solution of 110 grams of crystalline sodium acetate in 170 cc. of water is added and the mixture is extracted with benzene. The benzene extracts are washed with water, dried and evaporated in a water-jet vacuum. Crystallization of the residue (2.0 grams) from methylene chloride+acetone+petroleum ether yields the pure progesterone-19-acid melting at 136 to 136.5° C. Optical rotation $[\alpha]_D=+237°$ (in chloroform). In the ultra-violet spectrum a maximum appears at 244 m$\mu$ ($\epsilon=12,150$). The infra-red spectrum (in methylene chloride) contains bands inter alia at 2.85, 5.87 (with shoulder at 5.77$\mu$), 5.96, 6.76, 7.36, 8.12 and 8.58$\mu$.

Analogous oxidation of 17$\alpha$-acetoxy-19-hydroxy-progesterone gives rise to 17$\alpha$-acetoxy-progesterone-19-acid.

716 mg. of progesterone-19-acid are treated in a mixture of 10 cc. of methanol and 40 cc. of ether with an excess of an ethereal solution of diazomethane. After 15 minutes the reacted mixture is evaporated in a water-jet vacuum, the residue is dissolved in either, filtered and the filtrate evaporated; the residue is crystallized from methylene chloride+ether+petroleum ether, to yield 653 mg. of progesterone-19-acid methyl ester which on recrystallization melts at 141 to 142° C. Optical rotation $[\alpha]_D=+234°$ (in chloroform). Ultra-violet spectrum: maximum at 242 m$\mu$ ($\epsilon=14,900$). Infra-red spectrum (in methylene chloride): bands inter alia at 5.79, 5.87, 5.98, 6.18, 7.37, 8.50 and 8.61$\mu$.

A solution of 100 mg. of progesterone-19-acid in 2 cc. of methanol is treated with 0.15 cc. of concentrated hydrochloric acid and refluxed for 30 minutes. 5 cc. of water are then added, the methanol is distilled off in a water-jet vacuum and extracted with ether. The solution is washed with dilute sodium bicarbonate solution and with water, dried and evaporated. One recrystallization yields 50 mg. of 19-nor-progesterone melting at 144 to 145° C. Optical rotation $[\alpha]_D=+147°$.

By an analogous reaction 17$\alpha$-acetoxy-progesterone-19-acid yields 17$\alpha$-acetoxy-19-nor-progesterone.

*Example 7*

A solution of 2 grams of 19-hydroxy-testosterone-phenyl-propionate in 20 cc. of pyridine is added while cooling to 2 grams of chromium trioxide in 100 cc. of pyridine and the mixture is stirred for one hour at 20 to 25° C., then diluted with 500 cc. of benzene and stirred for 10 minutes with 50 grams of anhydrous sodium bicarbonate. The benzene solution is filtered off and freed from chromium compounds with the aid of a short column of alumina, then washed with 2 N-hydrochloric acid, dried with sodium sulfate and evaporated in vacuum. Recrystallization from ether yields 0.9 grams of $\Delta^4$-3:19-dioxo-17$\beta$-($\beta$-phenyl-propionyloxy)-androstene melting at 108 to 110° C.

Chromatography on silica gel of the mother liquor of the 19-oxo compound yields, in addition to 0.4 gram of pure aldehyde, 0.2 gram of $\Delta^{5(10)}$-3-oxo-17$\beta$-($\beta$-phenyl-propionyloxy)-19-nor-androstene as a colorless oil.

*Example 8*

6 cc. of an aqueous chromic acid solution which contains in 100 cc. 26.7 grams of chromium trioxide and 23 cc. of pure sulfuric acid is stirred into a cold solution of 2 grams of $\Delta^4$-3-oxo-17$\beta$-($\beta$-phenyl-propionyloxy)-19-hydroxy-androstene in 200 cc. of acetone. The mixture is stirred for another 30 minutes at 10 to 15° C., whereupon the excess chromic acid is decomposed by adding 20 cc. of isopropanol. After another 10 minutes at 15° C. the separated chromium salts are dissolved by adding 70 cc. of water and the solution is diluted with 100 cc. of methylene chloride. The dark aqueous layer is then separated and the organic solution is washed with 3 x 100 cc. of water and the aqueous layers are extracted with 2 x 100 cc. of methylene chloride. The organic solutions are dried, evaporated in a water-jet vacuum and further dried in a high vacuum, to yield 1.9 grams of $\Delta^4$-3-oxo-17$\beta$-($\beta$-phenyl-propionyloxy)-androstene-19-acid which is dissolved in ether and esterified with ethereal diazomethane solution. Yield: 2.1 grams of crude $\Delta^4$-3-oxo-17$\beta$-($\beta$-phenyl-propionyloxy)-androstene-19-acid methyl ester which melts at 112° C. after having been purified over a column of silica gel and crystallized from ether+pentane.

1 gram of the crude $\Delta^4$-3-oxo-17$\beta$-($\beta$-phenyl-propionyloxy)-androstene-19-acid described above is refluxed in 2 cc. of tertiary butanol with 0.1 cc. of 12 N-hydrochloric acid for 15 minutes on a bath maintained at 110° C. The reaction solution is cooled, diluted with benzene and ether, and this organic solution is washed with ice-cold sodium bicarbonate solution of 5% strength. Drying and evaporating under vacuum yields a crude product which is dissolved in a 1:1-mixture of benzene and ether and filtered through a column of alumina. The column retains a small amount of 19-nor-testosterone, and by evaporating the filtrate there is obtained 0.8 gram of $\Delta^4$-3-oxo-17$\beta$-($\beta$-phenyl-propionyloxy)-19-nor-androstene which on recrystallization from a small amount of ether melts at 95° C.

*Example 9*

A solution of 3.7 grams of $\Delta^4$-3-oxo-17$\beta$-decanoyloxy-19-hydroxy-androstene in 370 cc. of acetone is cooled to 10° C. and 11 cc. of an aqueous chromic acid solution containing in 100 cc. 26 grams of chromium trioxide and 23 cc. of concentrated sulfuric acid is stirred in. The mixture is stirred on for 30 minutes at 10 to 15° C. and the excess chromic acid is then decomposed by adding 40 cc. of isopropanol. After a further 10 minutes at 10 to 15° C. the reaction mixture is diluted with 400 cc. of benzene, the supernatant solution is decanted from the dark residue and washed with a mixture of 50 cc. of water and 100 cc. of ammonium sulfate solution of 45% strength, then with 2 x 50 cc. of water and once with 100 cc. of ammonium sulfate solution of 45% strength, dried over sodium sulfate and evaporated under vacuum, to yield 3.7 grams of $\Delta^4$-3-oxo-17$\beta$-decanoyloxy-androstene-19-acid. A solution of 2.7 grams of this crude product in 54 cc. of tertiary butanol is treated with 2.7 cc. of concentrated hydrochloric acid and refluxed at the boil for 15 minutes. The cooled reaction solution is diluted with benzene, the aqueous layer is separated and the organic layer is washed with ice-cold sodium bicarbonate solution until the washings run neutral, dried with sodium sulfate and evaporated in vacuum. The residue is dissolved in a 1:1-mixture of benzene and ether, filtered through an aluminum column and evaporated, to yield 2.2 grams of $\Delta^4$-3-oxo-17$\beta$-decanoyloxy-19-nor-androstene wihch melts at 38° C. after having been recrystallized from a small amount of n-pentane at −5° C.

*Example 10*

A solution of 4.0 grams of $\Delta^4$-3-oxo-6$\beta$:19-oxido-17$\beta$-hydroxy-androstene in 20 cc. of glacial acetic acid is added to a paste prepared from glacial acetic acid and 160 grams of zinc dust activated by washing with aqueous acetic acid and then with anhydrous acetic acid. While cooling, the mixture is stirred for 35 minutes at 25 to 30° C.; the excess zinc is then suctioned off and rinsed with glacial acetic acid. The filtrate is cautiously evaporated under reduced pressure. The residue contains $\Delta^5$-3-oxo-17$\beta$:19-dihydroxy-androstene; it is taken up in chloroform and agitated for 5 minutes with 12 N-hydrochloric acid. The chloroform solution is washed with sodium bicarbonate solution, dried with sodium sulfate and evaporated, to yield 3.4 grams of $\Delta^4$-3-oxo-17$\beta$:19-dihydroxy-androstene which melts at 197° C. after having been recrystallized from acetone.

Example 11

A solution of 10 grams of $\Delta^4$-3:17-dioxo-19-hydroxy-androstene in 1 liter of acetone is treated at 10° C. with 30 cc. of an aqueous chromic acid solution containing in 100 cc. 27 grams of chromium trioxide and 23 cc. of concentrated sulfuric acid and the mixture is stirred for 30 minutes at 10 to 15° C. The excess chromic acid is decomposed with isopropanol, the reaction mixture diluted with 1 liter of benzene and the undissolved salts are filtered off the organic solution which is then washed with 3 x 50 cc. of water with addition of a small amount of ammonium sulfate, then washed once with ammonium sulfate solution of 43% strength, twice dried over sodium sulfate and evaporated in vacuum. Yield: 10 grams of $\Delta^4$-3:17-dioxo-androstene-19-acid which, after having been recrystallized from ether, melts at 146° C. with decomposition. When an ethereal-methanolic solution of said acid is mixed with ethereal diazomethane solution, its methyl ester melting at 136 to 138° C. is obtained.

When the isomeric $\Delta^5$-3:17-dioxo-19-hydroxy-androstene is oxidized as described above instead of the $\Delta^4$-3:17-dioxo-19-hydroxy-androstene, the resulting main product is $\Delta^5$-3:17-dioxo-androstene-19-acid which can be esterified with diazomethane to yield its methyl ester melting at 241 to 243° C.

Example 12

A solution of 1.0 gram of $\Delta^4$-3:17-dioxo-19-hydroxy-androstene in 50 cc. of toluene and 10 cc. of cyclohexane is dried by distilling off 10 cc. of solvent. In the course of 40 minutes the boiling solution is treated dropwise with a solution of 1.2 grams of aluminum isopropylate in 50 cc. of toluene, cooled, diluted with benzene and ether, washed with 2 N-sulfuric acid, water, sodium bicarbonate solution and water, and the organic solution is dried and evaporated in a water-jet vacuum. Crystallization of the residue from ether yields 500 mg. of starting material. The residue of the mother liquor is chromatographed on 60 grams of silica gel. The fractions eluted with 9:1-mixture of benzene and ether yield $\Delta^4$-3:17-dioxo-19-nor-androstene melting at 169 to 171° C. Optical rotation $[\alpha]_D = +135°$ (in chloroform).

Example 13

1.8 grams of $\Delta^4$-3:17-dioxo-19-acetoxy-androstene are dissolved in a mixture of 2.0 cc. of orthoformic acid ethyl ester, 0.1 cc. of absolute alcohol and 10 cc. of dioxane and, after adding 0.5 cc. of a mixture of 5 cc. of dioxane and 0.25 cc. of concentrated sulfuric acid, allowed to stand for 20 minutes at 20–25° C. The reaction mixture is then poured into a solution of 5 grams of sodium acetate in 50 cc. of water and extracted with ether. From the dried ethereal solution there are obtained by evaporation 1.91 grams of crude $\Delta^{3,5}$-3-ethoxy-19-acetoxy-17-oxo-androstadiene in the form of a pale yellow oil. The crude product is dissolved in 50 cc. of toluene and, after the addition of a solution prepared from 2.0 grams of potassium and 50 cc. of tertiary amyl alcohol, the air above the reaction mixture is expelled with dry nitrogen. A weak current of pure, dry acetylene is then introduced for 12 hours with stirring. The reaction solution is then diluted with water, acidified with hydrochloric acid and the volatile portions removed by distillation with steam. The precipitated product is taken up in methylene chloride, the extracts washed with sodium bicarbonate water, dried and evaporated. The resulting crude product which contains $\Delta^4$-3-oxo-19-acetoxy-17$\beta$-hydroxy-17$\alpha$-ethinyl-androstene is dissolved in 50 cc. of methanol and, after the addition of 250 mg. of potassium carbonate and 10 cc. of water, stirred for 14 hours at room temperature. The $\Delta^4$ - 3-oxo - 17$\alpha$ - ethinyl - 17$\beta$:19-dihydroxy-androstene formed is isolated by diluting the reaction solution with water and extraction with methylene chloride. There are obtained 1.60 grams of crude product.

A solution of 1.31 grams of $\Delta^4$-3-oxo-17$\alpha$-ethinyl-17$\beta$:19-dihydroxy-androstene in 100 cc. of acetone is cooled to −15° C. 2.00 cc. of a solution of 2.67 grams of chromium trioxide and 2.3 cc. of concentrated sulfuric acid made up to 10.0 cc. with water are then slowly added dropwise while stirring vigorously. After 20 minutes the reaction solution is diluted with 70 cc. of water and extracted several times with benzene. The benzene-solutions washed with water are dried and evaporated at 50° C. bath temperature at a water-jet vacuum. There are obtained 1.02 grams of crude $\Delta^4$-3-oxo-17$\beta$-hydroxy-17$\alpha$-ethinyl-androstene-19-acid.

By esterifying the acid with diazo-methane there is obtained $\Delta^4$ - 3 - oxo-17$\beta$-hydroxy-17$\alpha$-ethinyl-androstene-19-acid methyl ester.

250 mg. of the free acid are heated in 10 cc. of pyridine for 1 hour at the boil, then evaporated to dryness at a water-jet vacuum, and the residue (235 mg.) crystallized from aqueous methanol. There are obtained 200 mg. of $\Delta^{5(10)}$-3-oxo-17$\alpha$-ethinyl-17$\beta$-hydroxy-androstene melting at 169–170° C.; optical rotation $[\alpha]_D = +108°$.

Example 14

A solution of 1.2 grams of $\Delta^4$-3-oxo-17$\alpha$-ethinyl-17$\beta$:19-dihydroxy-androstene in 15 cc. of pyridine is added with ice-cooling and stirring to an oxidation solution prepared from 40 cc. of pyridine, 10 cc. of water and 1.0 grams of chromium trioxide. The reaction mixture is then stirred for 90 minutes at 15–20° C. It is then diluted with benzene, washed several times with water, and the aqueous solution extracted again with benzene. There are obtained 910 mg. of a crude product which contains $\Delta^4$-3:19-dioxo-17$\alpha$-ethinyl-17$\beta$-hydroxy-androstene.

Example 15

34 mg. of $\Delta^4$-3-oxo-11$\alpha$:20$\beta$-diacetoxy-6$\beta$:19-oxido-pregnene are dissolved in 5 cc. of glacial acetic acid and stirred for 30 minutes at 100° C. after adding 1.0 gram of zinc dust. The solution is then cooled, the unused zinc is filtered off and filtrate is evaporated to dryness in a water-jet vacuum. The residue is taken up in methylene chloride and the solution is washed with dilute sodium bicarbonate solution and with water until neutral, dried and evaporated to dryness, to yield 32 mg. of crude $\Delta^4$-3 - oxo - 11$\alpha$:20$\beta$ - diacetoxy - 19 - hydroxypregnene, which shows bands in the IS spectrum inter alia at 2.79, 292, 5.77, 5.97, 6.16, 8.10, 9.72, 10.45 and 11.70 $\mu$.

By oxidation with chromic acid in acetone with the addition of sulfuric acid, $\Delta^4$-3-oxo-11$\alpha$:20$\beta$-diacetoxy-pregnene-19-acid is obtained therefrom which, on heating in pyridine, loses carbon dioxide and, on saponification of the crude product with potassium carbonate is methanol for 8 hours at 60° C. and carrying out oxidation once more of the $\Delta^4$-3-oxo-11$\alpha$:20$\beta$-dihydroxy-19-nor-pregnene thus obtained with chromic acid in acetone with the addition of sulfuric acid, the known $\Delta^4$-3:11:20-trioxo-19-norpregnene melting at 167–169° C. is obtained.

Example 16

2.216 grams of $\Delta^4$ - 3:11:20 - trioxo - 6$\beta$:19 - oxido-pregnene are dissolved in a mixture of 44 cc. of glacial acetic acid and 2.2 cc. of water, and within 20 minutes at 40° C. 22 grams of zinc dust are stirred in portionwise. On completion of the addition the mixture is stirred on for 10 minutes at 40° C., the unconsumed zinc is filtered off and rinsed with 44 cc. of glacial acetic acid, the filtrate contains $\Delta^5$ - 3:11:20 - trioxo - 19 - hydroxy - pregnene. The filtrate is mixed with 22 cc. of water and 2.2 grams of sodium acetate and stirred for 30 minutes at 100° C., then cooled, concentrated in a water-jet vacuum to about 10 cc. and diluted with water and methylene chloride. The organic solution is washed with sodium bicarbonate solution and water, dried and evaporated, to yield 2.12 grams of crude, crystalline $\Delta^4$-3:11:20 - trioxo - 19 - hydroxypregnene which, after recrystallization from methanol and acetone+ether, melts at 203–205° C. Optical rotation $[\alpha]_D = +232.6°$ (in chloroform). Ultra-violet maximum at 241 m$\mu$ ($\epsilon = 13,350$). Infra-red bands inter alia at 2.79, 2.90, 5.85, 5.98, 6.16, 7.20, 7.37, 8.24, 8.46 and 9.30$\mu$.

A solution of 500 mg. of $\Delta^4$-3:11:20-trioxo-19-hydroxypregnene in 20 cc. of acetone is cooled to 10° C. mixed with 1.9 cc. of 26.6% solution of chromium trioxide in sulfuric acid of 42% strength and the mixture is stirred for 30 minutes at 5–10° C., then diluted with 40 cc. of water and extracted three times with benzene. The benzene extracts are washed successively with water, saturated sodium carbonate solution and with water, dried and evaporated in a water-jet vacuum. Yield: 348 mg. of crude crystalline $\Delta^4$ - 3:11:19:20 - tetra - oxopregnene which, after recrystallization from methylene chloride+ether, settles out in the form of scales which above about 170° C. turn into spikes and then melt at 205-207° C. Optical rotation $[\alpha]_D = +527°$ (in chloroform). Ultra-violet maximum at 247 m$\mu$ ($\epsilon = 11,150$). Infra-red bands inter alia at 5.83, 5.95, 6.15, 7.19, 7.37, 8.16, 8.24, 8.65 and 11.60$\mu$.

The sodium carbonate extracts obtained as described above are acidified with 2 N-sulfuric acid and then extracted with methylene chloride. These extracts give a total yield of 173 mg. of crude $\Delta^4$-3:11:20-trioxopregnene-19-acid which is dissolved in 10 cc. of tertiary butanol. The solution is mixed with 1.0 cc. of concentrated hydrochloric acid and then refluxed for 20 minutes, concentrated in a water-jet vacuum to about 3 cc., diluted with methylene chloride, and the solution is washed with water and dilute sodium bicarbonate solution, dried and evaporated. Yield: 121 mg. of neutral product which is chromatographed on 5.0 grams of alumina. The fractions eluted with a 9:1-mixture of benzene and ethyl acetate give on crystallization from methylene chloride+ether 62 grams of $\Delta^4$ - 3:11:20 - trioxo - 19 - norpregnene (11-keto-19-norprogesterone) melting at 167–169° C. Optical rotation $[\alpha]_D = +278°$ (in chloroform). Ultra-violet maximum at 240 m$\mu$ ($\epsilon = 16,450$). Infra-red bands inter alia at 5.84, 5.97, 6.16, 7.20, 7.38, 8.33, 8.66, 9.42, 10.00 and 11.32$\mu$.

*Example 17*

A solution of 500 mg. of chromium trioxide in 5 cc. of water and 15 cc. of pyridine is mixed with 250 mg. of $\Delta^4$ - 3:11:20 - trioxo - 19 - hydroxypregnene, and the reaction mixture is stirred for 12 hours at 60° C., then cooled, poured into ice water and extracted with benzene. The extracts are washed with water, dilute hydrochloric acid and with water, dried and evaporated in a water-jet vacuum, to yield 162 mg. of a crystalline crude product. On recrystallization from methylene chloride+ether it yields pure $\Delta^4$-3:11:19:20-tetra-oxopregnene in flakes which above 180° C. turn into spikes and then melt at 201–203° C. According to its infra-red spectrum the compound is identical with the compound described in Example 16.

*Example 18*

A solution of 500 mg. of sodium hydroxide in 10 cc. of methanol is added to a solution cooled to 15° C. of 150 mg. of $\Delta^4$-3:11:19:20-tetraoxo-pregnene in 30 cc. of methanol, and the brown solution is allowed to stand for 30 minutes at 5 to 10° C. The reaction solution is acidified with 1 cc. of glacial acetic acid and extracted with methylene chloride. The extracts are washed with water, dried and evaporated to yield 155 mg. of crude $\Delta^4$-3:11:20-trioxo-19-nor-pregnene which is purified by chromatography on 7.0 grams of aluminum oxide. From the fractions eluted with benzene+ethyl acetate (9:1) there are obtained by crystallization from ethylene chloride +ether 107 mg. of pure $\Delta^4$-3:11:20-trioxo-19-nor-pregnene melting at 167–169° C.

*Example 19*

556 mg. of $\Delta^4$-3:11:20-trioxo-6$\beta$:19-oxidopregnene are dissolved in 20 cc. of glacial acetic acid and stirred for 30 minutes at 90–100° C. after adding 5.0 grams of zinc dust. After cooling, the unused zinc is separated by filtration and the filtrate is evaporated almost to dryness in a water-jet vacuum. The residue is then taken up in methylene chloride and the solution is washed with dilute sodium bicarbonate solution and with water, dried and evaporated, to yield 571 mg. of a mixture of $\Delta^4$- and $\Delta^5$-3:20-dioxo-11$\beta$:19-oxidopregnene. This mixture is dissolved in 25 cc. of methylene chloride, 2.5 cc. of concentrated hydrochloric acid are added and the mixture is stirred for 3 hours at room temperature. Dilution is then carried out with methylene chloride and the solution is washed until neutral, dried and evaporated. 500 mg. of crude $\Delta^4$-3:20-dioxo-11$\beta$:19-oxido-pregnene are obtained and this is chromatographed on 20 grams of hydrous silica gel for further purification. 281 mg. of the pure product are eluted with benzene+ethyl acetate mixture (4:1) which, after dissolution in acetone-ether and crystallization, melts at 168–171° C. Optical rotation $[\alpha]_D = +199.6°$. Ultraviolet maximum at 243 m$\mu$ ($\epsilon = 15,800$). Infra-red bands inter alia at 5.84, 5.96, 6.16, 7.35, 8.20 and 8.58$\mu$.

*Example 20*

A solution of 140 mg. of $\Delta^4$-3:11:20-trioxo-19-hydroxy-pregnene in 10 cc. of glacial acetic acid is heated to 100° C., and within 10 minutes 2.0 grams of zinc dust are stirred in portionwise. The batch is then stirred for 4 hours at 100° C., cooled, the undissolved material is filtered off and rinsed with glacial acetic acid and the filtrate is evaporated to dryness in a water-jet vacuum. The residue is dissolved in methylene chloride and the solution is washed with dilute sodium bicarbonate solution, dried and evaporated, to yield 143 mg. of a yellow residue. According to its paper-chromatographic analysis in the system formamide/cyclohexane-benzene 1:1 the product contains $\Delta^4$-3:20-dioxo-11$\beta$:19-oxidopregnene in addition to a more polar by-product. By chromatography on 5 grams of aqueous silica gel the pure compound can be isolated from the fractions eluted with benzene +ethyl acetate 4:1 by crystallization from acetone+ether. It melts at 168–171° C.

What is claimed is:
1. 11:19-dioxygenated-pregnenes of the formula

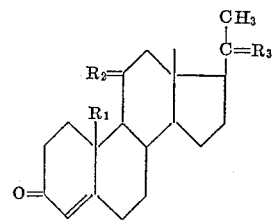

wherein $R_1$ stands for a member selected from the group consisting of a hydroxymethyl group and an aldehyde group, $R_2$ and $R_3$ stand for a member selected from the group consisting of oxo and hydrogen together with hydroxy and hydrogen together with acyloxy.

2. $\Delta^4$ - 3 - oxo - 11$\alpha$:20$\beta$ - diacetoxy - 19 - hydroxy-pregnene.

3. $\Delta^4$ - 3:11:20 - trioxo - 19 - hydroxy-pregnene.

4. Δ⁴ - 3:11:19:20-tetraoxo-pregnene.
5. A compound of the formula
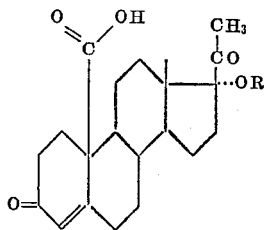
wherein R stands for an alkanoyl group with at most 15 carbon atoms.
References Cited in the file of this patent
UNITED STATES PATENTS
3,014,931  Nishikawa et al. _____ Dec. 26, 1961
3,088,953  Djerassi et al. _____ May 7, 1963
OTHER REFERENCES
Ehrenstein et al.: "Journal. Oreg. Chem.," December 1959, vol. 24, pages 2006–2008 relied on.